United States Patent
Kozakaya et al.

(10) Patent No.: US 9,639,779 B2
(45) Date of Patent: May 2, 2017

(54) FEATURE POINT DETECTION DEVICE, FEATURE POINT DETECTION METHOD, AND COMPUTER PROGRAM PRODUCT

(71) Applicant: KABUSHIKI KAISHA TOSHIBA, Minato-ku, Tokyo (JP)

(72) Inventors: Tatsuo Kozakaya, Kanagawa (JP); Tomokazu Kawahara, Kanagawa (JP); Susumu Kubota, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/848,583

(22) Filed: Sep. 9, 2015

(65) Prior Publication Data
US 2016/0086057 A1 Mar. 24, 2016

(30) Foreign Application Priority Data
Sep. 22, 2014 (JP) .................................. 2014-192873

(51) Int. Cl.
G06K 9/00 (2006.01)
G06K 9/62 (2006.01)

(52) U.S. Cl.
CPC ......... *G06K 9/6223* (2013.01); *G06K 9/6256* (2013.01); *G06K 9/6267* (2013.01)

(58) Field of Classification Search
CPC .. G06K 9/6223; G06K 9/6255–9/6259; G06K 9/6267–9/6287; G06T 2207/20081
See application file for complete search history.

(56) References Cited

U.S. PATENT DOCUMENTS

| 8,233,711 B2 | 7/2012 | Wang et al. |
| 8,494,258 B2 * | 7/2013 | Yokono ............. G06K 9/00369 382/103 |

(Continued)

FOREIGN PATENT DOCUMENTS

| JP | 2007-233997 | 9/2007 |
| JP | 2007-241579 | 9/2007 |

(Continued)

OTHER PUBLICATIONS

Cao, et al. "Face Alignment by Explicit Shape Regression", 2012 IEEE, pp. 2887-2894.

*Primary Examiner* — Aaron W Carter
(74) *Attorney, Agent, or Firm* — Amin, Turocy & Watson LLP

(57) ABSTRACT

According to an embodiment, a feature point detection device includes a generator to generate a K-class classifier and perform, for T times, an operation in which a first displacement vector is obtained that approximates D number of initial feature points of each training sample classified on a class-by-class basis to true feature points; a calculator to calculate, from the first displacement vectors, second displacement label vectors each unique to one second displacement vector, and a second displacement coordinate vector common to the second displacement vectors; a classifier to apply the K-class classifiers to the input image and obtain a second displacement label vector associated with a class identifier output from each K-class classifier; an adder to add up the second displacement label vectors; and a detector to detect D number of true feature points based on the initial feature points, the added label vector, and the second displacement coordinate vector.

19 Claims, 10 Drawing Sheets

(56) References Cited

U.S. PATENT DOCUMENTS

| | | | |
|---|---|---|---|
| 9,111,134 B1* | 8/2015 | Rogers | G06K 9/00302 |
| 2004/0022432 A1* | 2/2004 | Hayata | G06K 9/00221 |
| | | | 382/159 |
| 2004/0213454 A1* | 10/2004 | Lai | G06K 9/00268 |
| | | | 382/159 |
| 2006/0210168 A1* | 9/2006 | Kim | G06K 9/00275 |
| | | | 382/203 |
| 2007/0201729 A1 | 8/2007 | Yuasa et al. | |
| 2007/0211944 A1 | 9/2007 | Takeguchi et al. | |
| 2008/0219565 A1* | 9/2008 | Hattori | G06K 9/6256 |
| | | | 382/224 |
| 2008/0304699 A1 | 12/2008 | Yuasa | |
| 2009/0060290 A1* | 3/2009 | Sabe | G06K 9/00248 |
| | | | 382/118 |
| 2009/0116716 A1* | 5/2009 | Zhou | G06K 9/6857 |
| | | | 382/131 |
| 2010/0220922 A1* | 9/2010 | Okada | G06K 9/6282 |
| | | | 382/159 |
| 2012/0027288 A1* | 2/2012 | Yuan | G06K 9/6211 |
| | | | 382/152 |
| 2012/0134576 A1* | 5/2012 | Sharma | G06K 9/4604 |
| | | | 382/155 |
| 2012/0207384 A1* | 8/2012 | Porikli | G06K 9/00201 |
| | | | 382/154 |
| 2014/0098988 A1* | 4/2014 | Brandt | G06K 9/00281 |
| | | | 382/103 |
| 2014/0099031 A1* | 4/2014 | Brandt | G06K 9/00228 |
| | | | 382/201 |
| 2015/0206026 A1* | 7/2015 | Kim | G06K 9/4642 |
| | | | 382/170 |
| 2016/0086053 A1* | 3/2016 | Zhu | G06T 7/0028 |
| | | | 382/197 |
| 2016/0086057 A1* | 3/2016 | Kozakaya | G06K 9/6223 |
| | | | 382/159 |

FOREIGN PATENT DOCUMENTS

| | | |
|---|---|---|
| JP | 2008-146329 | 6/2008 |
| JP | 2011-210054 | 10/2011 |
| JP | 2013-114596 | 6/2013 |

* cited by examiner

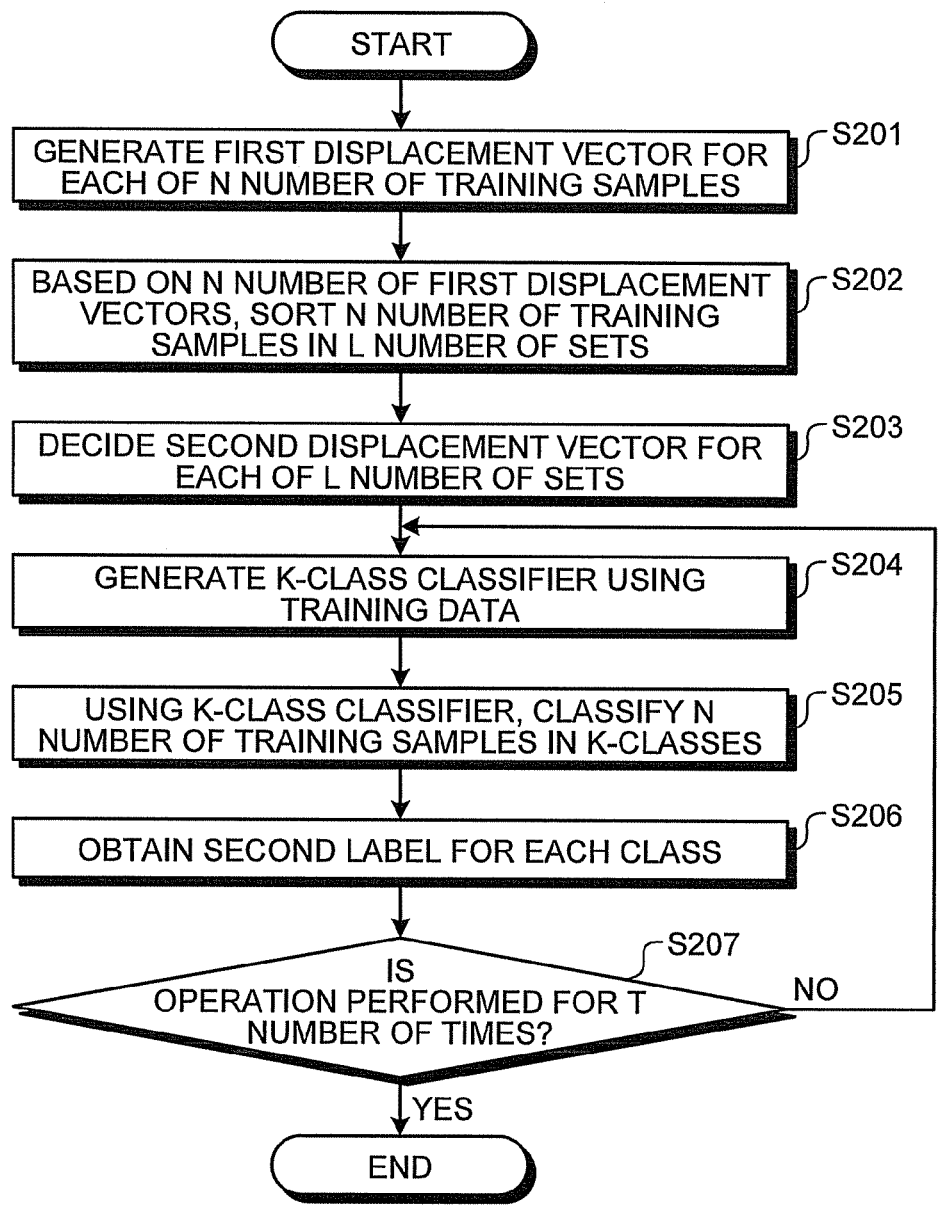

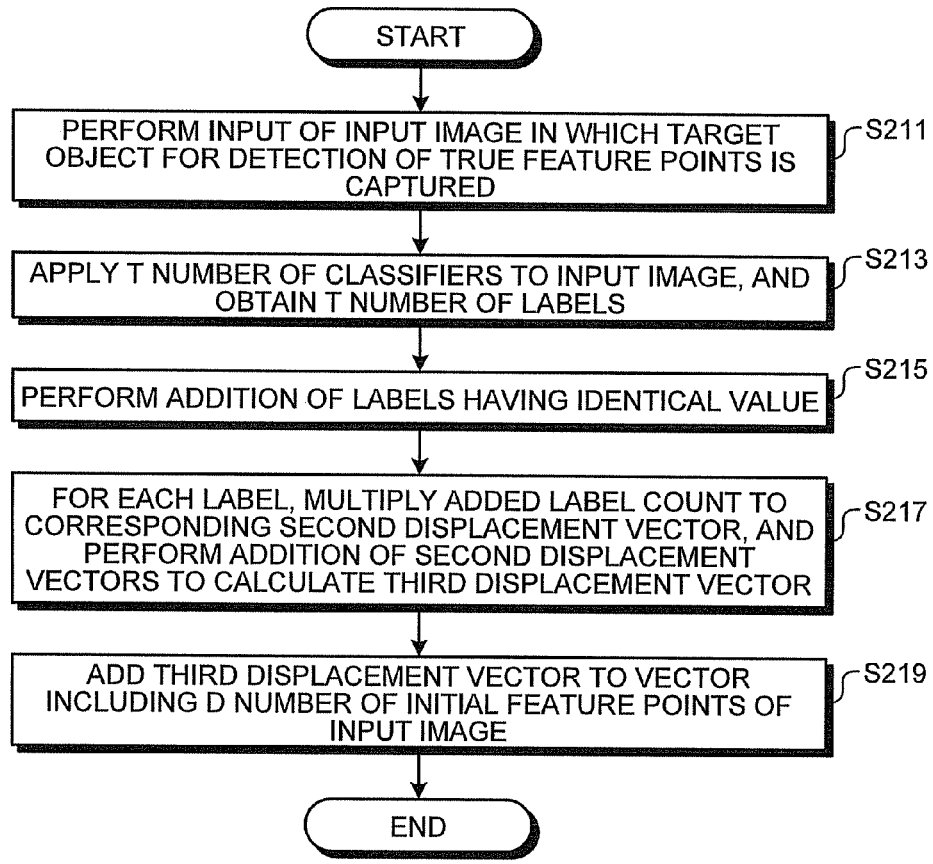
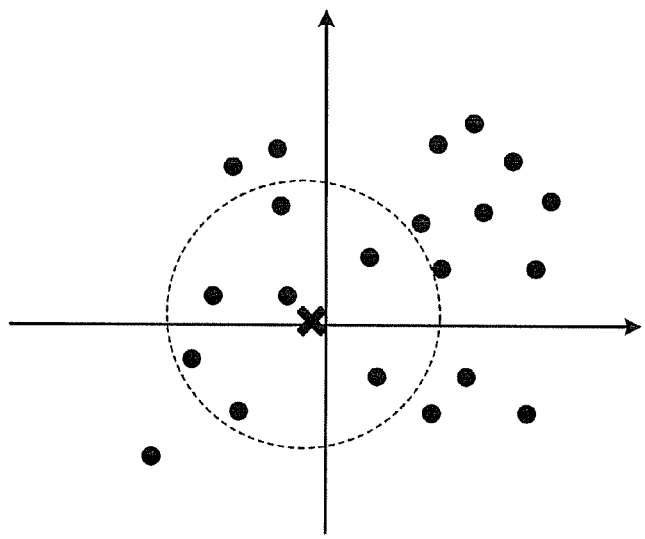

FEATURE POINT DETECTION DEVICE, FEATURE POINT DETECTION METHOD, AND COMPUTER PROGRAM PRODUCT

CROSS-REFERENCE TO RELATED APPLICATIONS

This application is based upon and claims the benefit of priority from Japanese Patent Application No. 2014-192873, filed on Sep. 22, 2014; the entire contents of which are incorporated herein by reference.

FIELD

Embodiments described herein relate generally to a feature point detection device, a feature point detection method, and a computer program product.

BACKGROUND

A technology is known for detecting feature points of an object that is captured in an input image. For example, from the face of a person captured in an input image, feature points such as the eyes, the nose, and the mouth are detected. Examples of such a feature point detection technology include the following technology.

For example, consider a case of detecting D (D≥1) number of true feature points of an object that is captured in an input image. In that case, D (D≥1) number of initial feature points are set in the object captured in the input image. Herein, the initial feature points correspond to the D number of true feature points.

Then, each of T (T≥1) number of K-class (K≥2) classifiers classifies the input image in one of K-classes, and outputs a displacement vector of the corresponding class. Herein, the K-class classifiers are classifiers learnt in advance using training (learning) samples in such a way that similar image patterns with respect to the coordinates of initial feature points are classified in the same class. The displacement vector of each class is a vector calculated in such a way that the coordinates of initial feature points of the training samples classified in the corresponding class are approximated to the coordinates of true feature points.

Lastly, T number of displacement-vectors output from the T number of K-class classifiers are sequentially added to an initial feature point vector consisting of the D number of initial feature points of an input image, and the initial feature point vector is sequentially updated. As a result, the D number of initial feature points are asymptotically approximated to the true feature points, and the D number of true feature points are detected.

In the conventional technology described above, it is necessary to store K×T number of displacement vectors representing high-dimensional data. That is, it is necessary to store a large amount of displacement vectors representing high-dimensional data. That leads to an increase in the required memory capacity.

BRIEF DESCRIPTION OF THE DRAWINGS

FIG. 9 is a flowchart for explaining preprocessing performed according to the second embodiment;

FIG. 10 is a flowchart for explaining post-processing performed according to the second embodiment;

FIG. 11 is an explanatory diagram of a conventional method;

DETAILED DESCRIPTION

Figure 1:
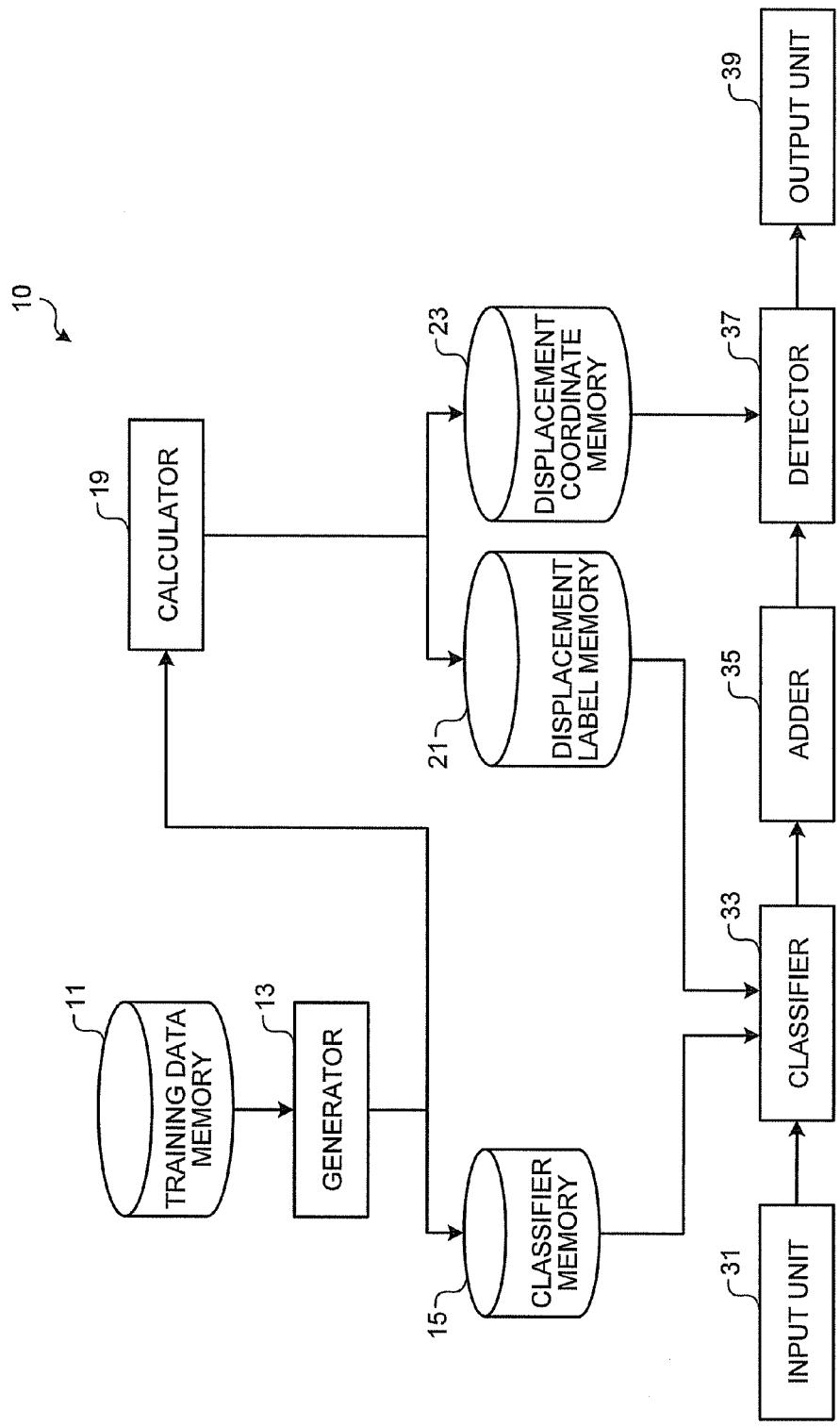
FIG. 1 is a configuration diagram illustrating an example of a feature point detection device according to a first embodiment.

According to an embodiment, a feature point detection device includes a training data memory, a generator, a classifier memory, a calculator, a displacement label memory, a displacement coordinate memory, an input unit, a classifier, an adder, and a detector. The training data memory stores therein training data. The training date represents a set of N (N≥2) number of training samples each of which holding an image pattern of a sample image, D (D≥1) number of true feature points captured in the sample image, and D number of initial feature points corresponding to the D number of true feature points in association with one another. The generator performs, for T (T≥1) number of times, a generating operation. In the generating operation, using the training data, a K-class classifier is generated which is expected to classify training samples having a similar image pattern at the initial feature points of the sample image in same class from among K-classes (K≥2) and which outputs a class identifier of the class in which the training samples are classified; and using the K-class classifier, the N number of training samples are classified in the K-classes and, for each class, a first displacement vector is obtained that approximates the D number of initial feature points of each training sample classified in the class to the D number of true feature points. The classifier memory stores therein the T number of K-class classifiers. The calculator calculates, from K×T number of the first displacement vectors and in order to express second displacement vectors to which the K×T number of first displacement vectors are approximated, second displacement label vectors, each being unique to one of K×T number of the second displacement vectors, and a second displacement coordinate vector common to the K×T number of second displacement vectors. The displacement label memory stores therein, in association with each of K×T number of the second displacement label vectors, a class identifier of a class from which is obtained a first displacement vector approximated to a second displacement vector of the second displacement label vector. The displacement coordinate memory stores therein the second displacement coordinate vector. The input unit receives an input image in which D number of initial feature points are set. The classifier applies the T number of K-class classifiers to the input image and, for each K-class classifier, obtains, from the displacement label memory, a second displacement label vector associated with a class identifier output from the K-class classifier. The adder performs addition of T number of the second displacement label vectors so as to obtain an added label vector. The detector detects D number of true feature points of the input image based on the D number of initial feature points set in the input image, based on the added label vector, and based on the second displacement coordinate vector.

Embodiments of the invention are described below in detail with reference to the accompanying drawings.

First Embodiment

FIG. 1 is a configuration diagram illustrating an example of a feature point detection device 10 according to a first embodiment. As illustrated in FIG. 1, the feature point detection device 10 includes a training data memory 11, a generator 13, a classifier memory 15, a calculator 19, a displacement label memory 21, a displacement coordinate memory 23, an input unit 31, a classifier 33, an adder 35, a detector 37, and an output unit 39.

The training data memory 11, the classifier memory 15, the displacement label memory 21, and the displacement coordinate memory 23 can be implemented using a memory device such as a hard disk drive (HDD), a solid state drive (SSD), a memory card, an optical disc, a random access memory (RAM), or a read only memory (ROM) in which information can be stored in a magnetic, optical, or electrical manner.

The generator 13, the calculator 19, the classifier 33, the adder 35, the detector 37, and the output unit 39 can be implemented by executing computer programs in a processor such as a central processing unit (CPU), that is, can be implemented using software; or can be implemented using hardware such as an integrated circuit (IC); or can be implemented using a combination of software and hardware.

The input unit 31 can be implemented with devices such as a digital camera, a network interface, and a memory medium that can receive input of images.

The training data memory 11 is used to store training data that is used in generating K-class classifiers (K≥2). Herein, the training data represents a collection of N (N≥2) number of training samples.

In a training sample, the followings are held in association with one another: the image pattern of a sample image; D (D≥1) number of true feature points captured in that sample image; and D number of initial feature points corresponding to the D number of true feature points. More specifically, in a training sample, the followings are held in association with one another: an image vector I consisting of pixel values of a sample image; a true feature point vector Y consisting of coordinates of D number true feature points of an object captured in the sample image; and an initial feature point vector S consisting of coordinates of D number of initial feature points of the object captured in the sample image.

Herein, examples of an object captured in a sample image include the face of a person. Accordingly, examples of the true feature points include feature points such as the eyes, the nose, and the mouth. However, those are not the only possible examples. The initial feature points are feature points corresponding to the true feature points. Meanwhile, the initial feature points either can be common to the N number of sample images or can be unique to each of the N number of sample images. Herein, it is assumed that the coordinates of each sample image are expressed using a common coordinate system that is normalized using the central coordinates of the object or the size of the object. For that reason, in each sample image, the coordinates of the D number of true feature points and the coordinates of the D number of initial feature points are also expressed using the common coordinate system.

Figure 2:
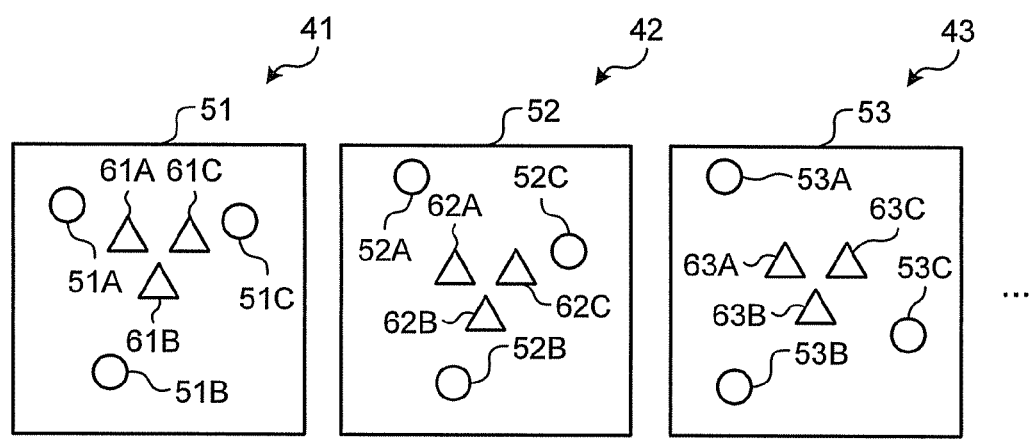
FIG. 2 is a schematic diagram illustrating an example of training data according to the first embodiment.

FIG. 2 is a schematic diagram illustrating an example of the training data according to the first embodiment. In FIG. 2, training samples 41 to 43 are illustrated. In the training sample 41, the followings are held in association with one another: a sample image 51 (more specifically, the image vector I of the sample image 51); three true feature points 51A to 51C of an object (not illustrated) captured in the sample image 51 (more specifically, the feature point vector Y consisting of the coordinates of the true feature points 51A to 51C); and initial feature points 61A to 61C corresponding to the true feature points 51A to 51C, respectively (more specifically, the initial feature point vector S consisting of the coordinates of the initial feature points 61A to 61C). Similarly, in the training sample 42, the followings are held in association with one another: a sample image 52 (more specifically, the image vector I of the sample image 52); three true feature points 52A to 52C of an object (not illustrated) captured in the sample image 52 (more specifically, the feature point vector Y consisting of the coordinates of the true feature points 52A to 52C); and initial feature points 62A to 62C corresponding to the true feature points 52A to 52C, respectively (more specifically, the initial feature point vector S consisting of the coordinates of the initial feature points 62A to 62C). Moreover, in the training sample 43, the followings are held in association with one another: a sample image 53 (more specifically, the image vector I of the sample image 53); three true feature points 53A to 53C of an object (not illustrated) captured in the sample image 53 (more specifically, the feature point vector Y consisting of the coordinates of the true feature points 53A to 53C); and initial feature points 63A to 63C corresponding to the true feature points 53A to 53C, respectively (more specifically, the initial feature point vector S consisting of the coordinates of the initial feature points 63A to 63C).

Meanwhile, the initial feature points can be set based on a predetermined algorithm, or can be set according to an operation input from the user who has the empirical knowledge regarding the object. Examples of the predetermined algorithm include an algorithm in which a corresponding true feature point is extracted from each of N number of sample images; the average value of the coordinates of the extracted N number of true feature points is calculated; and, in each of N number of sample images, an initial feature point is set at the coordinates representing the average value.

For example, in the example illustrated in FIG. 2, the true feature points 51A, 52A, and 53A represent true feature points of the right eye; the true feature points 51B, 52B, and 53B represent true feature points of the left eye; and the true feature points 51O, 52C, and 53C represent true feature points of the nose.

In this case, according to the predetermined algorithm mentioned above, the true feature points 51A, 52A, and 53A are extracted as the true feature points of the right eye. Then, the average value of the coordinates of the true feature points 51A, 52A, and 53A is obtained. Subsequently, in the sample images 51 to 53, initial feature points 61A to 63A of the right eye are set at the coordinates representing the average value, respectively.

In an identical manner, according to the predetermined algorithm mentioned above, the true feature points 51B, 52B, and 53B are extracted as the true feature points of the left eye. Then, the average value of the coordinates of the true feature points 51B, 52B, and 53B is obtained. Subsequently, in the sample images 51 to 53, initial feature points 61B to 63B of the left eye are set at the coordinates representing the average value, respectively.

In an identical manner, according to the predetermined algorithm mentioned above, the true feature points 51C, 52C, and 53C are extracted as the true feature points of the nose. Then, the average value of the coordinates of the true feature points 51C, 52C, and 53C is obtained. Subsequently, in the sample images 51 to 53, initial feature points 61C to 63C of the nose are set at the coordinates representing the average value, respectively.

In the example illustrated in FIG. 2, in all training samples (in the training samples 41 to 43), there are three types of true feature points (i.e., D=3 holds true). However, the types of true feature points need not be the same in all training samples. If the types of true feature points differ among the training samples, the number D of the true feature points in the training samples is considered to be the total number of types of true feature points that have been associated. That is, depending on a training sample, it is not necessary that the D number of types of true feature points are assigned, and some feature points may be lacking or omitted. In a training sample, if there is a deficit of true feature points, a deficit flag indicating that the true feature points are not assigned is set in that training sample. In that case, the generator 13 (described later) performs operations without using the true feature points of the training sample in which the deficit flag is set.

The generator 13 performs a generation operation (a learning operation) repeatedly for T (T≥1) number of times. The generation operation includes a classifier generation (learning) step and a first displacement-vector calculation (learning) step. In the classifier generation step, using the training data stored in the training data memory 11, a K-class classifier is generated (learnt) that is expected to classify the training samples having a similar image pattern at the initial feature points of a sample image in the same class from among the K-classes (K≥2). In the first displacement-vector calculation step, N number of training samples are classified in K-classes using the K-class classifier generated in the classifier generation step; and for each class, a first displacement vector is obtained (learnt) that approximates the D number of initial feature points of each training sample classified in the corresponding class to the D number of true feature points.

Firstly, the explanation is given about the classifier generation step. In the classifier generation step, the generator 13 uses the training data and generates a K-class classifier R that classifies, preferably in the same class, such training samples which have the similar image vector I of the sample image with respect to the initial feature point S. For example, the classifier R extracts, from the image vector I, image feature quantities surrounding the initial feature points; calculates the similarity among the feature quantities; and classifies the similar samples.

Regarding the method of generating a classifier that classifies (divides) the similar training samples preferably in the same class; it is possible to implement any arbitrary method. For example, the method disclosed in Non-patent Literature 1 (Xudong Cao, Yichen Wei, Fang Wen, Jian Sun "Face alignment by Explicit Shape Regression" CIPR 2012, 2887-2894) can be implemented, or a commonly-known method such as the method of using random forests or the support vector machine method can be implemented.

More particularly, the K-class classifier R, which is generated in the classifier generation step, receives input of the image vector I and the initial feature point vector S of a training sample; identifies the K-class to which the image vector I belongs; and outputs a class identifier c (which is a value between 1 to K) representing the identified class. Meanwhile, as described above, even if two training samples differ from each other, as long as the features of the initial feature point vector S and the image vector I are similar, both training samples are expected to be classified in the same class.

Given below is the explanation of the first displacement-vector calculation step. In the first displacement-vector calculation step, the generator 13 firstly makes use of the K-class classifier R generated in the classifier generation step and classifies the N number of training samples in the K-classes.

Herein, $N_c$ ($N_c \geq N$) represents the number of training samples classified in the class represented by the class identifier c (hereinafter, sometimes referred to as the "class c").

The sample images of the $N_c$ number of training samples that are classified in the class c are expected to have mutually similar image patterns. Hence, regarding the arrangement of the true feature points and the initial feature points too, the sample images are expected to be highly likely to be similar. For that reason, it is possible to think that a single significant displacement can be obtained which enables achieving reduction in the sum of the errors against the true values with respect to all of the $N_c$ number of sample images, that is, which enables making the initial feature point vector S to asymptotically approach the true feature point vector Y (true values).

In that regard, using Expression (1) given below, the generator 13 obtains, for each class c, a first displacement vector $X_c$ that enables making an initial feature point vector $S_i$ of each of the $N_c$ number of training samples classified in the class c to asymptotically approach a true feature point vector Y. Herein, the initial feature point vector $S_i$ represents the initial feature point vector of a training sample i, while the true feature point vector $Y_i$ represents the true feature point vector of the training sample i; where i is a value from 1 to N.

$$\operatorname*{argmin}_{X} \sum_{i \in \{N_c\}} \|Y_i - (S_i + X_c)\|^2 \quad (1)$$

The first displacement vector $X_c$ that satisfies Expression (1) can be easily obtained from the average of ($Y_i - S_i$) as given below in Expression (2).

$$X_c = \frac{1}{N_c} \sum_{i \in \{N_c\}} (Y_i - S_i) \quad (2)$$

Figure 3:
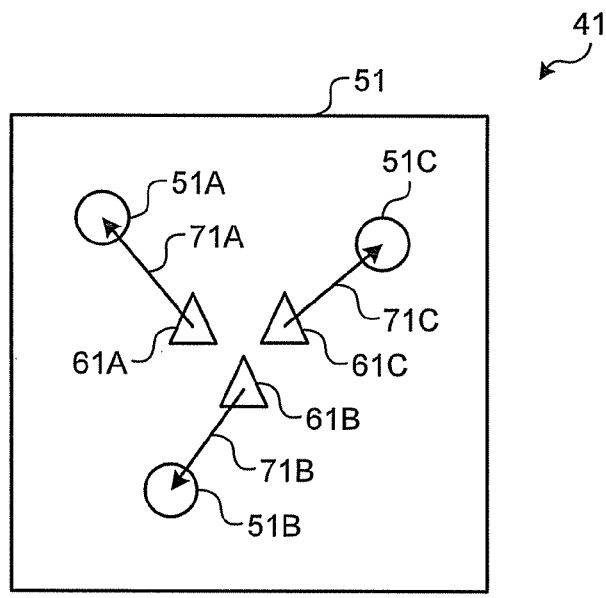
FIG. 3 is a diagram illustrating an example of a zeroth displacement vector according to the first embodiment.

Explained below with reference to FIG. 3 is a zeroth displacement vector ($Y_i - S_i$) that represents the difference between the true feature point vector $Y_i$ and initial feature point vector $S_i$ of the training sample i. FIG. 3 is a diagram illustrating an example of the zeroth displacement vector according to the first embodiment. Herein, the explanation is given with reference to the training sample 41. In the case of the training sample 41 illustrated in FIG. 3, the zeroth displacement vector consists of the followings: a displacement 71A that is a residual vector between the initial feature point 61A and the true feature point 51A; a displacement 71B that is a residual vector between the initial feature point 61B and the true feature point 51B; and a displacement 71C that is a residual vector between the initial feature point 61C and the true feature point 51C.

In the first embodiment, the coordinates of the initial feature points and the coordinates of the true feature points are assumed to be two-dimensional coordinates (x, y). Hence, the true feature point vector Y, the initial feature point vector S, and the first displacement vector $X_c$ represent 2×D-dimensional vectors.

As described above, as a result of performing the generation operation once, the generator 13 generates a single K-class classifier and K number of first displacement vectors. Then, the generator 13 performs the generation operation repeatedly for T number of times, and eventually generates T number of K-class classifiers and T×K number of first displacement vectors.

That is done because, in the case of applying a K-class classifier generated by the generator 13 to an input image having unknown true feature points; if only a single K-class classifier is used, then the first displacement vector of the class identified by that K-class classifier is not necessarily the most suitable first displacement vector of that class. That is, if only a single classifier is used, then it becomes difficult to always return the most suitable first displacement vector to any type of input image. Generally, such an issue is taken care of by combining the outputs of a plurality of K-class classifiers (more specifically, low-accuracy weak classifiers).

Meanwhile, as a result of performing the generation operation repeatedly for T number of times, if a plurality of K-class classifiers having similar features is obtained, it is less effective due to redundancy. Hence, it is desirable that the K-class classifiers are not similar to each other. That is, it is desirable that there is only a small correlation among the K-class classifiers. In that regard, the generator 13 can be configured to generate each K-class identifier using randomness. With that, even if the same K-class classifiers may get generated for a plurality of number of times using the same training data, it becomes possible to prevent the generation of similar K-class classifiers.

As a method of using randomness, for example, a method is disclosed in Non-patent Literature 1 in which zeroth displacement vectors are once projected in the space defined by a random matrix, and then the minimization problem is solved so as to reduce the correlation among the classifiers. However, that is not the only possible method to reduce the correlation among the classifiers. Alternatively, for example, from the N number of training samples, N' (N'<N) number of training samples can be randomly selected; and the generation operation can be performed using the N' number of training samples so that similar K-class classifiers are not generated.

Moreover, the coordinates of the initial feature points of the N number of training samples can be updated according to the T×K number of first displacement vectors obtained by performing the generation operation for T number of times, and the generation algorithm explained earlier with reference to the generation operation can be re-implemented. For example, the coordinates of the initial feature points of the i-th training sample can be updated using Expression (3) given below.

$$S_i' = S_i + \frac{1}{T}\sum_{t=1}^{T} X_{c_i}^t \quad (3)$$

Herein, $X_{c_i}^t$ represents the first displacement vector of a class $C_i$ in which the i-th training sample is classified by the K-class classifier $R_t$ that is generated during the generation operation performed for the t-th time. That is, in Expression (3), to the initial feature point vector $S_i$ of the i-th training sample is added the first displacement vector of the class $C_i$ in which the i-th training sample is classified by the K-class classifier $R_t$ that is generated during the generation operation performed for t-th time, and a post-updating initial feature point vector $S_i'$ is obtained.

Expression (3) is applied to all training samples and all initial feature point vectors $S_i$ are updated to initial feature point vectors $S_i'$; and the generation algorithm explained earlier with reference to the generation operation can be implemented while treating the post-updating initial feature point vectors $S_i'$ as the initial feature point vectors $S_i$. Meanwhile, the image vector I and the feature vector Y of the training samples can be used without modification.

As a result, the initial feature points move closer to the corresponding true feature points, thereby making it possible to perform a more precise generation operation.

The classifier memory 15 is used to store the T number of K-class classifiers generated by the generator 13.

The calculator 19 calculates, from the K×T number of first displacement vectors and in order to express second displacement vectors to which the K×T number of first displacement vectors are approximated, second displacement label vectors, each being unique to one of the K×T number of second displacement vectors, and a second displacement coordinate vector common to the K×T number of second displacement vectors.

As described earlier, a first displacement vector represents 2×D-dimensional data. Thus, higher the value of D, the higher is the dimension of the data. Hence, if the K×T number of first displacement vectors, which are obtained by the generator 13, are held without modification; then a large amount of memory capacity (for example, memory size) needs to be secured for the purpose of holding the first displacement vectors, thereby leading to an increase in the cost.

In that regard, in the first embodiment, instead of holding the K×T number of first displacement vectors; the K×T number of second displacement label vectors and the second displacement coordinate vector are held so as to reduce the required memory capacity. Herein, since the second displacement vectors are vectors of a lower dimension than the approximated first displacement vectors, reduction in the memory capacity can be achieved.

In the first embodiment, the calculator 19 performs principal component analysis on the K×T number of first displacement vectors, and calculates the second displacement coordinate vector. Meanwhile, the scale for calculating the second displacement coordinate vector is not limited to the principal component analysis; and can alternatively be at least one of the linear sum, the dispersion, and the order statistics of the K×T number of first displacement vectors. The second displacement coordinate vector represents a set of linearly-independent base vectors which establish the subspace including the K×T number of first displacement vectors. Then, the calculator 19 projects the K×T number of first displacement vectors in the space formed based on the second displacement coordinate vector, and obtains the K×T number of second displacement label vectors. Herein, the second displacement label vectors consists of linear coefficients with respect to the base vectors. Moreover, the K×T number of second displacement label vectors have mutually different values.

More particularly, the calculator 19 performs principal component analysis on the K×T number of first displacement vectors, and obtains a plurality of eigenvectors. Then, of the obtained eigenvectors, the calculator 19 treats M (M<min(2×D, T×K)) number of eigenvectors in descending order of eigenvalues as the base vectors which establish the subspace including the K×T number of first displacement vectors. In this case, the set of M number of base vectors represents the second displacement coordinate vector. Moreover, the calculator 19 projects the K×T number of second displacement label vectors in the space that is established by the M number of base vectors, and obtains the K×T number of second displacement label vectors. In this case, the second displacement label vectors consist of linear coefficients with respect to the M number of base vectors. Meanwhile, each linear coefficient is scalar in nature. Moreover, min(2×D, T×K) is a function that returns the smaller value between 2×D and T×K.

Each of the K×T number of first displacement vectors can be approximated to a second displacement vector using the linear combination (the linear sum) of the M number of base vectors (however, for each first displacement vector, the coefficient of linear combination is different). Hence, of the K×T number of first displacement vectors, an arbitrary first displacement vector is approximated to a second displacement vector using Expression (4).

$$X = a_1 v_1 + a_2 v_2 + \ldots a_M v_M \quad (4)$$

Herein, X represents an arbitrary first displacement vector; $v_1$ to $v_M$ represent the M number of base vectors; and $a_1$ to $a_M$ represent the coefficients obtained by projecting the arbitrary first displacement vector in the space established by the base vectors $v_1$ to $v_M$. Moreover, the collection of base vectors $v_1$ to $v_M$ represents the second displacement coordinate vector, and a vector consisting of the coefficients $a_1$ to $a_M$ is the second displacement label vector.

The displacement label memory 21 is used to store, in association with each of the K×T number of second displacement label vectors calculated by the calculator 19, the class identifier of the class from which is obtained the first displacement vector approximated to the second displacement vector of the corresponding second displacement label vector. Alternatively, the displacement label memory 21 can be used to store, in association with each of the K×T number of second displacement label vectors calculated by the calculator 19, the classifier identifier of the K-class classifier used at the time of obtaining the first displacement vector approximated to the second displacement vector of the corresponding second displacement label vector and the class identifier of the class from which the corresponding first displacement vector is obtained.

The displacement coordinate memory 23 is used to store the second displacement coordinate vector calculated by the calculator 19.

In the case of storing the first displacement vectors without modification, since the first displacement vectors have 2×D number of dimensions and since the total number of first displacement vectors is K×T, it is necessary to have the memory capacity equivalent to the size of 2×D×K×T.

In contrast, in the first embodiment, the first displacement vectors are not stored without modification. Instead, the second displacement label vectors and the second displacement coordinate vector calculated by the calculator 19 are stored. Herein, the second displacement label vectors have M number of dimensions, and the total number of second displacement label vectors is equal to K×T. Moreover, the second displacement coordinate vector has M×2×D dimensions (the base vectors have 2×D dimensions) and there is one second displacement coordinate vector in all. Hence, it is sufficient to have the memory capacity equivalent to the size of M×K×T+M×2×D.

The input unit 31 receives an input image. In an input image, the target object for detection of true feature points is captured, and the initial feature points corresponding to D number of true feature points are set in advance (i.e., the initial feature point vector S is set in advance). However, D number of true feature points that are to be detected are of course not known (not set). The setting of D number of initial feature points of the input image can be done either according to the method explained with reference to the training data memory 11 or using a conventional feature point detection technology. Herein, regarding the target object for detection of true feature points that is captured in the input image, it is possible to think of the face of a person. Thus, examples of the D number of true feature points include the eyes, the nose, and the mouth. However, those are not the only possible examples. Meanwhile, the coordinates of the input image are normalized according to the central coordinates of the object and the size of the object, and are assumedly expressed using the same coordinate system as the coordinate system of the sample images. For that reason, the coordinates of the D number of initial feature points of the input image are also expressed using the same coordinate system as the coordinate system of the sample images.

Herein, an input image can be an image from which is removed the background that has no relation with the captured object. The removal of background can be done using, for example, a conventional object detection technology in which an object captured in the input image is detected and the area other than the detected object is removed.

The classifier 33 applies the T number of K-class classifiers, which are stored in the classifier memory 15, to the input image that is input from the input unit 31; and, for each K-class classifier, obtains, from the displacement label memory 21, the second displacement label vector associated with the class identifier output from the corresponding K-class classifier. For example, from the displacement label memory 21, the classifier 33 obtains, for each K-class classifier, the class identifier output from the corresponding K-class classifier and the second displacement label vector associated with the classifier identifier of the corresponding K-class classifier.

In an identical manner to the case of the training samples, when the image pattern (the image vector I) and the initial feature point vector S of the input image are input, each K-class identifier identifies the K-class to which the input image vector I belongs and outputs a class identifier c representing the identified class.

The adder 35 performs addition of the T number of second displacement label vectors obtained from the classifier 33, and obtains an added label vector.

The detector 37 detects the D number of true feature points of the input image, which is input from the input unit 31, based on the D number of initial feature points set in the input image; based on the added label vector obtained by addition by the adder 35; and based on the second displacement coordinate vector stored in the displacement coordinate memory 23.

More particularly, the detector 37 multiplies the added label vector by the second displacement coordinate vector, so as to obtain a third displacement vector consisting of the displacements between the D number of initial feature points of the input image and the D number of corresponding true feature points. More specifically, the detector 37 performs linear combination of the added label vector and the second displacement coordinate vector, so as to obtain the third displacement vector. Then, the detector 37 adds the third displacement vector to the initial feature point vector consisting of the D number of initial feature points, so as to detect (obtain) the D number of true feature points of the input image.

In the first embodiment, the classifier 33 obtains T number of second displacement label vectors. Hence, the third displacement vector that is added to the initial feature point vector consisting of the D number of initial feature points of the input image is equivalent to the T number of second displacement vectors. However, in the T number of second displacement vectors, the second displacement coordinate vector (the vector consisting of M number of base vectors) is common, while the second displacement label vectors (the vectors consisting of M number of coefficients) are unique. Hence, in the first embodiment, firstly, T number of second displacement label vectors are added, followed by linear combination with the second displacement coordinate vector.

For example, assume that $\{a_{11}, \ldots, a_{1M}\}, \ldots, \{a_{T1}, \ldots, a_{TM}\}$ represent the T number of second displacement label vectors; and $\{v_{11}, \ldots, v_{1M}\}$ represents the second displacement coordinate vector. In that case, the adder 35 performs addition of the T number of second displacement label vectors to obtain $(\{a_{11}+ \ldots +a_{1M}\}, \ldots, \{a_{T1}+ \ldots +a_{TM}\})$. Then, the detector 37 performs linear combination with the second displacement coordinate vector $\{v_1, \ldots, v_1\}$ to obtain the third displacement vector $\{(a_{11}+ \ldots +a_{1M})v_1, \ldots, (a_{T1}+ \ldots +a_{TM})v_M\}$.

In the first embodiment, the third displacement vector is obtained according to the method described above, and is then added to the initial feature point vector consisting of the D number of initial feature points of the input image. With that, the D number of true feature points of the input image are detected. Hence, as compared to the conventional technology, at the time of detecting the D number of true feature points of the input image, the number of times of performing the addition can be held down. Hence, the detection operation can be expected to be carried out at high speeds.

In the first embodiment, in order to detect the D number of true feature points of the input image, the addition needs to be done for T×M number of times. That is, in order to obtain the third displacement vector, the addition needs to be done for T×(M−1) number of times. In order to add the third displacement vector to the initial feature point vector consisting of the D number of initial feature points of the input image, the addition needs to be done for T number of times. Hence, the total is equal to T×M number of times.

In contrast, in the conventional technology, the T number of first displacement vectors are added to the initial feature point vector consisting of the D number of initial feature points of the input image, and the D number of true feature points are detected. Herein, since the first displacement vectors are 2×D-dimensional vectors, addition needs to be done for T×2×D number of times for the purpose of detecting the D number of true feature points of the input image.

The output unit 39 outputs the input image in which the detector 37 has detected the D number of true feature points. For example, the output unit 39 outputs the input image, in which the D number of true feature points have been set, either to display device (not illustrated) for display purpose or to a memory device (not illustrated).

Figure 4:
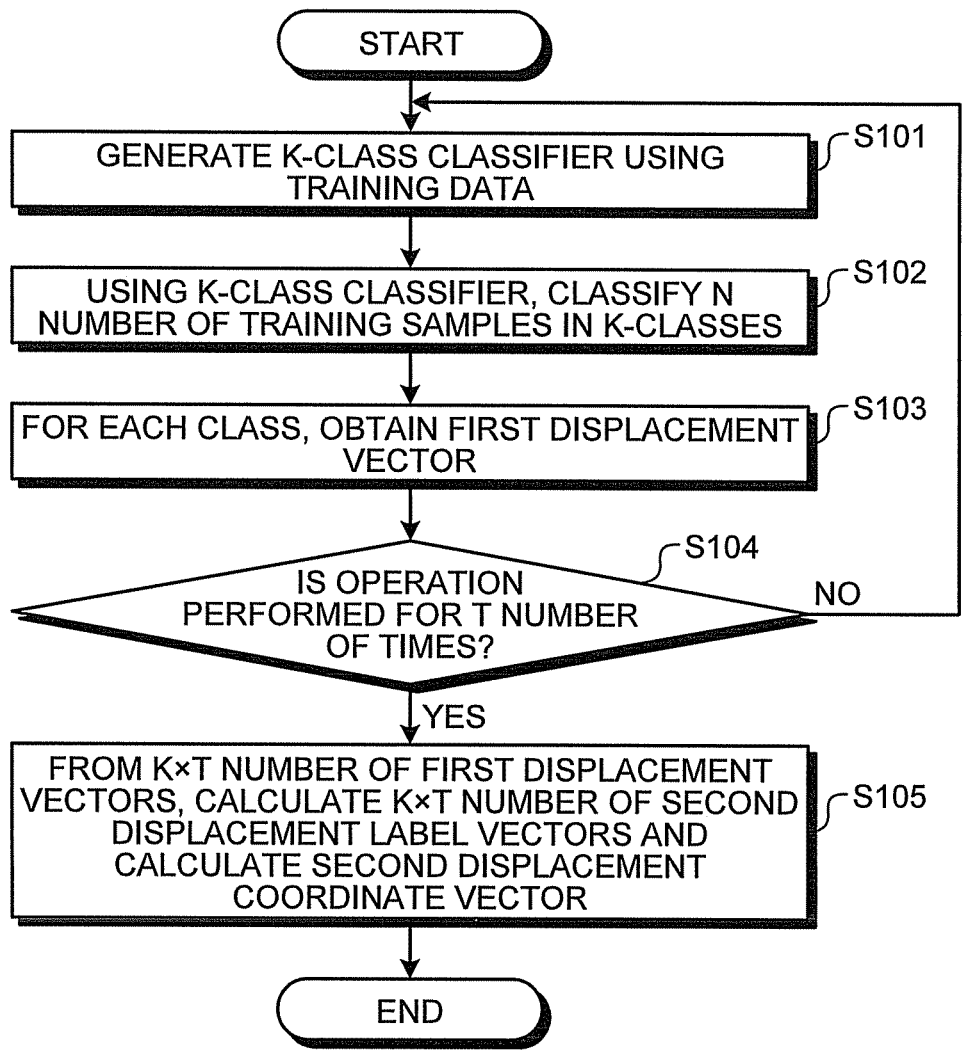
FIG. 4 is a flowchart for explaining preprocessing performed according to the first embodiment.

FIG. 4 is a flowchart for explaining an exemplary sequence of operations during preprocessing performed in the feature point detection device 10 according to the first embodiment.

Firstly, the generator 13 makes use of the training data, which is stored in the training data memory 11, and generates a K-class classifier that is expected to classify, in the same class from among the K-classes, the training samples having a similar image pattern with respect to the initial feature point vector S of a sample image, and that outputs the class identifier of the class in which the training samples are classified (Step S101).

Then, the generator 13 makes use of the K-class classifier that is generated and classifies N number of training samples in the K-classes (Step S102).

Subsequently, the generator 13 obtains, for each class, a first displacement vector that approximates D number of initial feature points of each training sample classified in the corresponding class to D number of true feature points (Step S103).

The generator 13 performs the generation operation from Steps S101 to S103 repeatedly for T number of times (No at Step S104).

Once the generator 13 performs the generation operation for T number of times (Yes at Step S104), the calculator 19 calculates, from K×T number of first displacement vectors and in order to express second displacement vectors to which the K×T number of first displacement vectors are approximated, second displacement label vectors, each being unique to one of the K×T number of second displacement vectors, and a second displacement coordinate vector common to the K×T number of second displacement vectors (Step S105).

Figure 5:
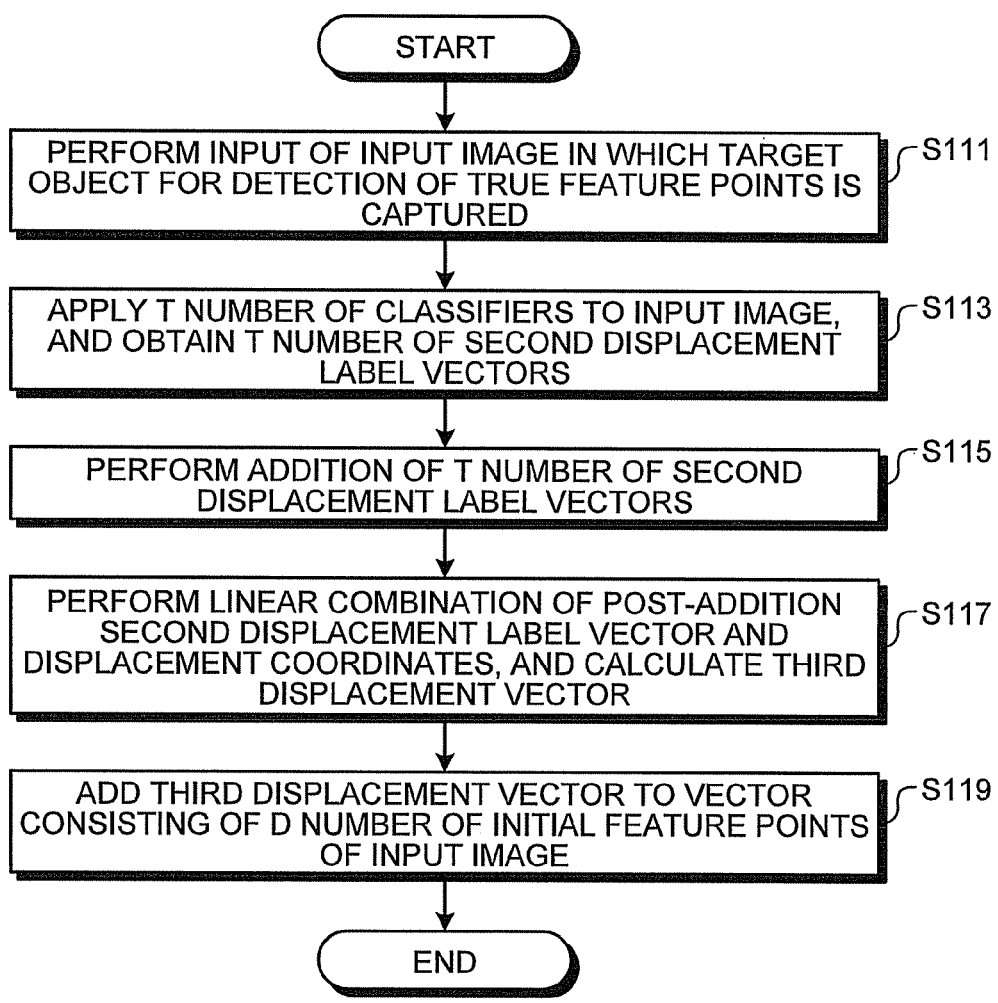
FIG. 5 is a flowchart for explaining post-processing performed according to the first embodiment.

FIG. 5 is a flowchart for explaining an exemplary sequence of operations during post-processing performed in the feature point detection device 10 according to the first embodiment.

Firstly, the input unit 31 inputs an input image in which the target object for detection of true feature points is captured (Step S111).

Then, the classifier 33 applies the T number of K-class classifiers, which are stored in the classifier memory 15, to the input image that is input from the input unit 31; and, for each K-class classifier, obtains, from the displacement label memory 21, the second displacement label vector associated with the class identifier output from the corresponding K-class classifier. With that, the classifier 33 obtains T number of second displacement label vectors (Step S113).

Then, the adder 35 performs addition of the T number of second displacement label vectors (Step S115); and the detector 37 obtains a third displacement vector by performing linear combination of an added label vector, which represents the post-addition second displacement label vector, and the second displacement coordinate vector (Step S117).

Subsequently, the detector 37 adds the third displacement vector to the initial feature point vector consisting of the D number of initial feature points of the input image, and detects the D number, of true feature points of the input image (Step S119). Then, the output unit 39 outputs the input image in which the detector 37 has detected the D number of true feature points.

In this way, according to the first embodiment, the K×T number of first displacement vectors are not stored. Instead, the K×T number of second displacement label vectors and a single second displacement coordinate vector, which are used in expressing the second displacement vectors to which the K×T number of first displacement vectors are approximated, are stored. That makes it possible to hold down the required memory capacity.

Moreover, according to the first embodiment, the T number of second displacement label vectors are added, followed by linear combination with the second displacement coordinate vector. With that, the third displacement vector is obtained. Then, the third displacement vector is added to the initial feature point vector consisting of the D number of initial feature points of the input image, and the D number of true feature points of the input image are detected. Therefore, it also becomes possible to hold down the number of times for which calculation needs to be performed to detect the D number of true feature points of the input image.

Second Embodiment

In a second embodiment, the explanation is given about a different method than the first embodiment. The following explanation is given with the main focus on the differences with the first embodiment. Thus, the constituent elements having identical functions to the first embodiment are referred to by the same names and the same reference numerals, and the relevant explanation is not repeated.

Figure 6:
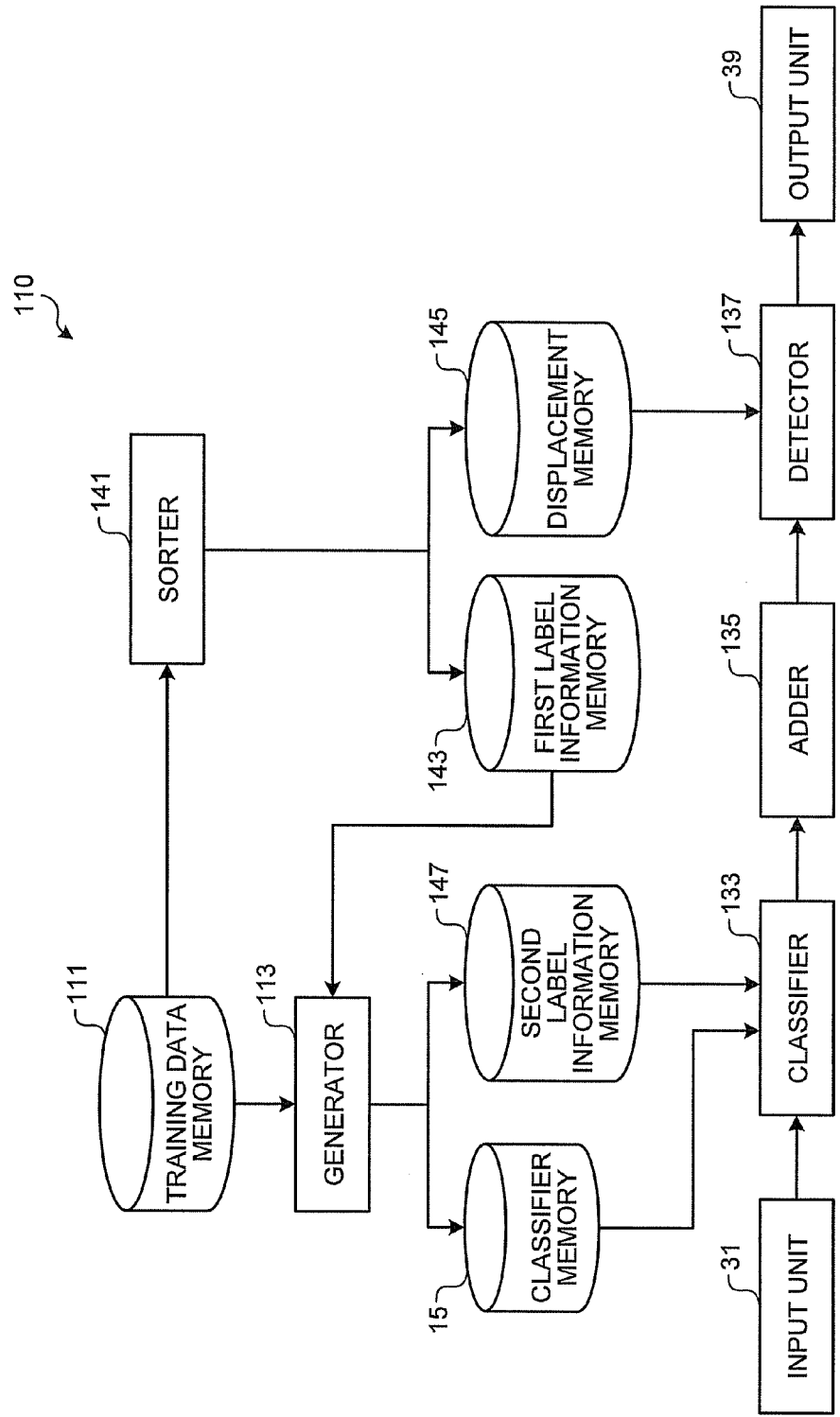
FIG. 6 is a configuration diagram illustrating an example of a feature point detection device according to a second embodiment.

FIG. 6 is a configuration diagram illustrating an example of a feature point detection device 110 according to the second embodiment. As illustrated in FIG. 6, the feature point detection device 110 includes a training data memory 111, a sorter 141, a first label information memory 143, a displacement memory 145, a generator 113, the classifier memory 15, a second label information memory 147, the input unit 31, a classifier 133, an adder 135, a detector 137, and the output unit 39.

The training data memory 111 is identical to that in the first embodiment.

The sorter 141 generates, for each of the N number of training samples stored in the training data memory 111, a first displacement vector consisting of the displacements between the D number of initial feature points and corresponding true feature points; sorts the N number of training samples into L number of sets based on the N number of first displacement vectors; and decides, for each of the L number of sets, a second displacement vector that represents the representative first displacement vector of the corresponding set. Herein, a first displacement vector is identical to a zeroth displacement vector explained in the first embodiment. Hence, the relevant explanation is not repeated.

Figure 7:
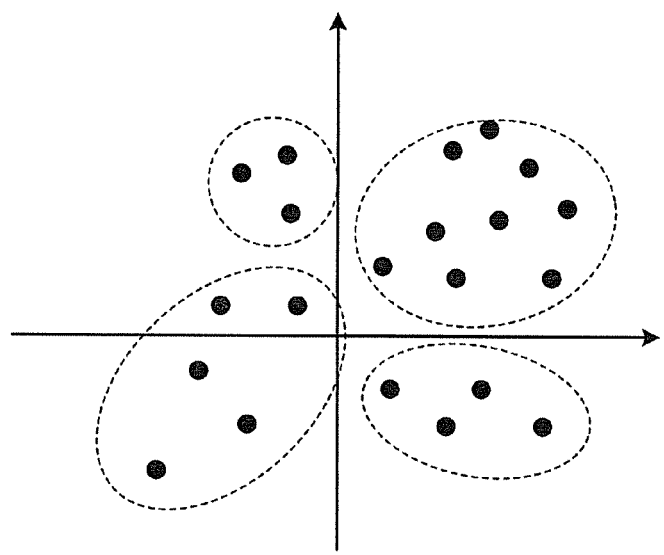
FIG. 7 is an explanatory diagram of an example of clusters according to the second embodiment.

In the second embodiment, a set represents a cluster. Thus, the sorter 141 makes use of the distances of the N number of first displacement vectors so as to perform clustering of the N number of training samples into L number of clusters. The distance of a first displacement vector can be defined, for example, using the Euclidean distance of the displacements constituting the first displacement vector. A cluster can be defined, for example, using the distance from the origin in the displacement space (more specifically, using the range of distances). In the second embodiment, as illustrated in FIG. 7, it is desirable that the clusters are defined within a range of distances that do not cross over the origin in the displacement space. The reason for that is described later. Meanwhile, in the example illustrated in FIG. 7, filled circles represent the positions of the first displacement vectors (the training samples) in the displacement space; while circles drawn with dotted lines represent the clusters. Meanwhile, with respect to the clustering, it is possible to implement, for example, the K-means clustering method or the mean shift clustering method.

Thus, for each of the N number of training samples, the sorter 141 calculates the distance of the first displacement vector of the corresponding training sample, and sorts that training sample into a cluster in accordance with the calculated distance.

Moreover, in the second embodiment, for each of the L number of clusters, the sorter 141 decides a second displacement vector using at least one of the following scales: the linear sum, the dispersion, and the order statistics of the distance of the first displacement vectors of the training samples sorted into the corresponding cluster. For example, for each of the L number of clusters, the sorter 141 calculates the average value of the distances of the first displacement vectors of the training samples sorted into the corresponding cluster, and decides the first displacement vector having the closest distance to the calculated average value as the second displacement vector.

Meanwhile, in the second embodiment, regarding the method of sorting the N number of training samples into L number of sets, although the explanation is given about clustering, that is not the only possible case. Alternatively, it is also possible to use principal component analysis in an identical manner to the first embodiment.

The first label information memory 143 is used to store, for each first label representing one of the L number of sets, first label information in association with sample identifiers of the training samples sorted in the set represented by the corresponding first label.

The displacement memory 145 is used to store, for each first label representing one of the L number of sets, the second displacement vector of the set represented by the corresponding first label.

The generator 113 performs the generation operation (the learning operation) repeatedly for T number of times. The generation operation includes a classifier generation (learning) step and a second label calculation (learning) step. The classifier generation step is identical to that explained in the first embodiment. Hence, the relevant explanation is not repeated. In the second label calculation step, the N number of training samples are classified in K-classes using the K-class classifier generated in the classifier generation step; and a second label is obtained for each class based on the training samples classified in the corresponding class and based on the first label information stored in the first label information memory 143. More particularly, for each class, the second label is calculated based on the training samples classified in the corresponding class and based on the first label information stored in the first label information memory 143.

Figure 8:
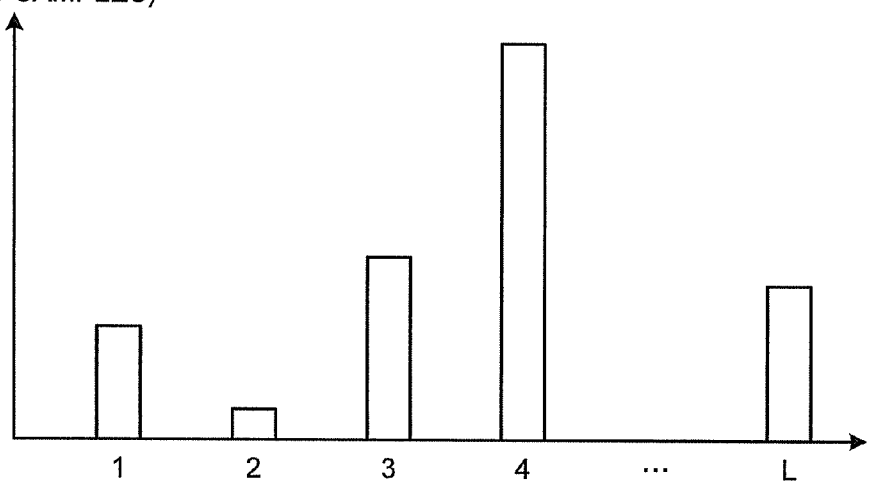
FIG. 8 is an explanatory diagram of an example of a frequency histogram according to the second embodiment.

For example, a second label is the first label representing the set in which, from among one or more training samples classified in a particular class, the maximum number of training samples are sorted. In this case, the generator 113 refers to the first label information and, as illustrated in FIG. 8, generates a frequency histogram that has L number of bins and that indicates which of one or more training samples classified in a particular class is sorted in which of the L number of clusters (bins); and sets the first label indicating the cluster having the highest frequency of appearance as the second label. The generator 113 performs this operation on all clusters. Meanwhile, in the example illustrated in FIG. 8, the fourth cluster has the highest frequency of appearance among the clusters. Hence, the first label representing the fourth cluster serves as the second label.

Meanwhile, instead of setting the first label having the highest frequency of appearance in the generated frequency histogram as the second label, the generator 113 can set the frequency histogram itself as the second label. In that case, the cluster having the highest frequency of appearance can be set to have the value "1" and the other clusters can be set to have the value "0"; and the appearance of frequency of each cluster can be normalized with the highest frequency of appearance.

The classifier memory 15 is identical to that explained in the first embodiment.

The second label information memory 147 is used to store, in association with each of the K×T number of second labels, the class identifier of the class from which the corresponding second label is obtained. For example, the second label information memory 147 can be used to store, in association with each of the K×T number of second labels, the classifier identifier of the K-class classifier used while obtaining the corresponding second label and the class identifier of the class from which the corresponding second label is obtained.

The input unit 31 is identical to that explained in the first embodiment.

The classifier 133 applies the T number of K-class classifiers, which are stored in the classifier memory 15, to the input image that is input from the input unit 31; and, for each K-class classifier, obtains, from the second label information memory 147, the second label associated with the class identifier output from the corresponding K-class classifier. For example, for each K-class classifier, the classifier 33 obtains, from the second label information memory 147, the class identifier output from the corresponding K-class classifier and the second label associated with the classifier identifier of the corresponding K-class classifier.

The adder 135 performs addition of second labels having an identical value from among the T number of second labels obtained by the classifier 133, and obtains the additional value for each second label. That is, the adder 135 counts the number of appearances of each of the T number of second labels. Meanwhile, if the second labels represent a frequency histogram, then the adder 135 can perform addition of the T number of second labels.

The detector 137 detects D number of true feature points of the input image, which is input from the input unit 31, based on the D number of initial feature points set in the input image, based on the additional value obtained for each second label by the adder 135, and based on the L number of second displacement vectors stored in the displacement memory 145.

More particularly, the detector 137 obtains the L number of second displacement vectors from the displacement memory 145; multiplies each second displacement vector by the additional value of the corresponding second label; performs addition of the second displacement vectors to which the additional values of the respective second labels have been multiplied; and obtains a third displacement vector consisting of the displacements between the D number of initial feature points of the input image and the D number of corresponding true feature points. Thus, in the second embodiment, the third displacement vector is obtained by taking a weighted sum of the number of second labels and the second display vectors.

Then, the detector 137 adds the third displacement vector to the D number of initial feature point vectors of the input image, and detects the D number of true feature points of the input image.

The output unit 39 is identical to that explained in the first embodiment.

FIG. 9 is a flowchart for explaining an exemplary sequence of preprocessing performed in the feature point detection device 110 according to the second embodiment.

Firstly, the sorter 141 generates, for each of the N number of training samples stored in the training data memory 111, a first displacement vector consisting of the displacements between the D number of initial feature points and corresponding true feature points (Step S201).

Then, based on the N number of first displacement vectors, the sorter 141 sorts the N number of training samples into L number of sets (Step S202).

Subsequently, the sorter 141 decides, for each of the L number of sets, a second displacement vector that represents the representative first displacement vector of the corresponding set (Step S203).

Then, the generator 113 makes use of the training data stored in the training data memory 111 to generate a K-class classifier that is expected to classify the training samples having a similar image pattern with respect to the initial feature point vector S of a sample image in the same class from among the K-classes, and that outputs the class identifier of the class in which the training samples are classified (Step S204).

Subsequently, the generator 113 makes use of the K-class classifier that is generated to classify the N number of training samples in the K-classes (Step S205).

Then, the generator 113 obtains, for each class, a second label based on the training samples classified in the corresponding class and based on the first labels stored in the first label information memory 143 (Step S206).

The generator 113 performs the generation operation from Steps S204 to S206 repeatedly for T number of times (No at Step S207). Once the generator 113 performs the generation operation for T number of times (Yes at Step S207), it marks the end of the preprocessing.

FIG. 10 is a flowchart for explaining an exemplary sequence of operations during post-processing performed in the feature point detection device 110 according to the second embodiment.

Firstly, the input unit 31 receives an input image in which the target object for detection of true feature points is captured (Step S211).

Then, the classifier 133 applies the T number of K-class classifiers, which are stored in the classifier memory 15, to the input image that is input from the input unit 31; and, for each K-class classifier, obtains, from the second label information memory 147, the second label associated with the class identifier output from the corresponding K-class classifier. With that, the classifier 133 obtains the T number of second labels (Step S213).

Subsequently, the adder 135 performs addition of second labels having an identical value from among the T number of second labels obtained by the classifier 133, and obtains the additional value for each second label (Step S215). The detector 137 obtains the L number of second displacement vectors from the displacement memory 145; multiplies each second displacement vector by the additional value of the corresponding second label; performs addition of the second displacement vectors to which the additional values of the respective second labels have been multiplied; and obtains a third displacement vector consisting of the displacements between the D number of initial feature points of the input image and the D number of corresponding true feature points (Step S217).

Then, the detector 137 adds the third displacement vector to the D number of initial feature point vectors of the input image, and detects the D number of true feature points of the input image (Step S219). The output unit 39 outputs the input image in which the detector 137 has detected the D number of true feature points.

In this way, in the second embodiment too, the K×T number of first displacement vectors are not stored. Instead, the first label information, the second label information, and the L number of second displacement vectors are stored. That makes it possible to hold down the memory capacity.

Moreover, according to the second embodiment, it becomes possible to enhance the learning efficiency.

For example, in the method disclosed in Non-patent Literature 1, the average value of the zeroth displacement vectors of the training samples classified in the same class is used in the first displacement vector. In that method, during the learning, as illustrated in FIG. 11, when the training samples are selected isotropically across the origin in the displacement space, the average value of the zeroth vector becomes equal to a value in the vicinity of the origin. Hence, the effect at the time of detection of the true feature points of the input image (i.e., the updating range of the initial feature points) becomes small. That leads to a delay in the learning convergence, and the learning efficiency undergoes a decline. Meanwhile, in the example illustrated in FIG. 11, filled circles represent the positions of the displacement vectors (the learning samples) in the displacement space; the circles drawn with dotted lines represent the selection range of the training samples; and a cross mark represents the average value of the zeroth displacement vectors.

In contrast, in the second embodiment, as illustrated in FIG. 7, it is desirable that the clusters are defined within a range of distances that do not cross over the origin in the displacement space; and, for each cluster, the second displacement vector is decided using at least one of the linear sum, the dispersion, and the order statistics of the distances of the first displacement vectors of the learning samples sorted in the corresponding cluster. Hence, according to the second embodiment, the second displacement vectors can be prevented from becoming equal to a value in the vicinity of the origin. As a result, the effect at the time of detection of the true feature points of the input image (i.e., the updating range of the initial feature points) does not become small. That enables swift convergence of the generation operation, and the generation efficiency can be enhanced.

Modification Example

In the embodiments described above, the explanation is given for an example in which an input image, in which the D number of true feature points of a captured object have been detected, is output. However, alternatively, analysis can be performed based on the D number of true feature points, and the analysis result can be output. The following explanation is given about a modification example of the first embodiment. However, the same modification example is applicable to the second embodiment too.

Figure 12:
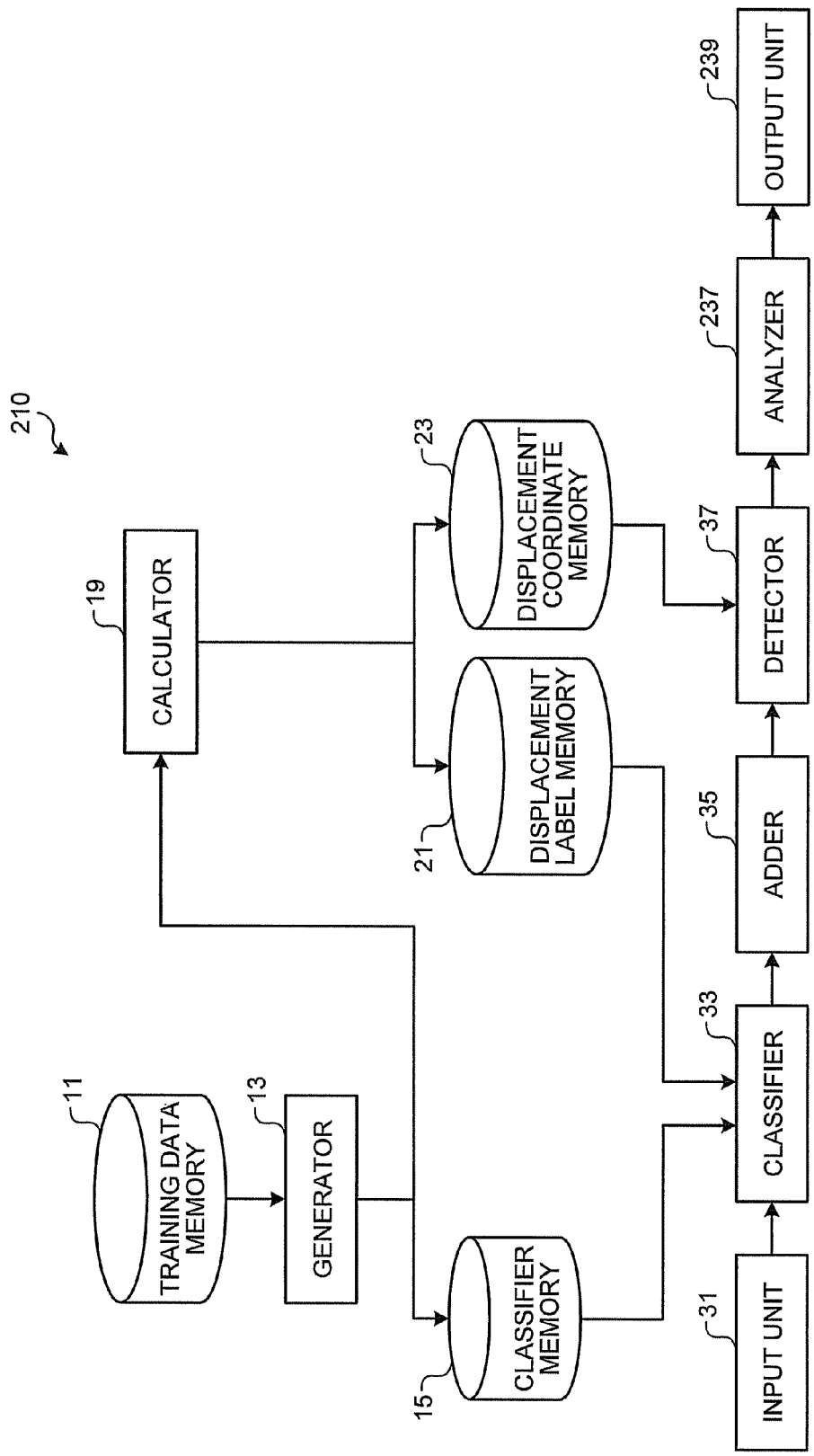
FIG. 12 is a configuration diagram illustrating an example of a feature point detection device according to a modification example.

FIG. 12 is a configuration diagram illustrating an example of a feature point detection device 210 according to the modification example. As illustrated in FIG. 12, an analyzer 237 and an output unit 239 are different from the first embodiment.

The analyzer 237 analyzes the input image in which the detector 37 has detected the D number of true feature points. The output unit 239 outputs the analysis result of the analyzer 237.

For example, assume that the feature point detection device 210 is used in a drive assist system that monitors the condition of the driver of a vehicle, and the input unit 31 inputs an input image in which the driver is captured. The input image can be a moving image or can be still images taken on a periodic basis. Moreover, prior to the input of the input image to the classifier 33, a known face position detection technology may be used to roughly detect the position of the face of the driver captured in the input image.

Then, assume that, as the D number of true feature points, the detector 37 detects the positions of the apples of the eyes, the positions of the tails of the eyes, the positions of the inner corners of the eyes, the upper/lower positions of the eyelid, the position of the nose tip, and the positions of the end points of the mouth of the driver who is captured in the input image.

In that case, the positions of the apples of the eyes, the positions of the tails of the eyes, the positions of the inner corners of the eyes, the upper/lower positions of the eyelids, the position of the nose tip, and the positions of the end points of the mouth of the driver who is captured in the input image are periodically input to the analyzer 237 from the detector 37. Then, the analyzer 237 analyzes the changes in those positions and thus analyzes the condition of the driver.

For example, the analyzer 237 analyzes the changes in the distance between the upper and lower ends of the apples of the eyes and analyzes the level of opening and closing of the eyelids. If it is analyzed that the eyelids are closed over a certain period of time or beyond, then the analyzer 237 analyzes that there is a risk of the driver dozing off at the wheel. Hence, the output unit 239 notifies a display device or a speech device about the risk.

Moreover, for example, the analyzer 237 analyzes the changes in the position of the nose tip and analyzes the orientation of the face. If it is analyzed that the orientation of the face is not in the front direction over a certain period of time or beyond, then the analyzer 237 analyzes that there is a risk of the driver not looking in the direction of travelling. Hence, the output unit 239 notifies a display device or a speech device about the risk.

Furthermore, for example, the analyzer 237 analyzes the changes in the position of the lips and analyzes the level of opening and closing of the mouth. If the analyzer 237 analyzes that the driver is uttering words, the output unit 239 notifies a sound-input-type navigation device about the same. With that, the sound-input-type navigation device can determine whether the input sound is the voice of the driver or some background noise such as music. Hence, it can be expected to achieve enhancement in the accuracy of sound input.

In this way, if the feature point detection device 210 is used in a drive assist system, it becomes possible to enhance the safety and usability while driving.

Meanwhile, for example, assume that the feature point detection device 210 is used in a line-of-sight estimation system that estimates the line of sight of a person, and that the input unit 31 inputs an input image in which the target user for line-of-sight estimation is captured. Moreover, prior to the input of the input image to the classifier 33, a known face position detection technology may be used to roughly detect the position of the face of the driver captured in the input image.

Then, it is assumed that, as the D number of true feature points, the detector 37 detects the positions of the apples of the eyes, the positions of the tails of the eyes, the positions of the inner corners of the eyes, the upper/lower positions of the eyelid, the position of the nose tip, and the positions of the end points of the mouth of the driver who is captured in the input image.

In that case, the positions of the apples of the eyes, the positions of the tails of the eyes, the positions of the inner corners of the eyes, the upper/lower positions of the eyelid, the position of the nose tip, and the positions of the end points of the mouth of the driver who is captured in the input image are input to the analyzer 237 from the detector 37. Then, the analyzer 237 analyzes the changes in those positions and analyzes the line of sight of the user.

For example, the analyzer 237 can analyze the line of sight of the user by analyzing the positional relationship between the apples of the eyes and the tails of the eyes/the inner corners of the eyes, or can analyze the line of sight of the user according to the method disclosed in Japan Patent Application Laid-open 2008-194146.

In this way, if the feature point detection device 210 is used in a line-of-sight estimation system, it can be used in various applications such as in a non-contact-type user interface or in marketing for measuring the degree of interest/attention of advertisements. In such in-vehicle embedded system applications, it is often the case that the installed memory capacity is restricted as compared to a general-purpose computer. Hence, it becomes significant to have a technology such as the invention for performing operations efficiently and with a smaller amount of memory.

Hardware Configuration

Figure 13:
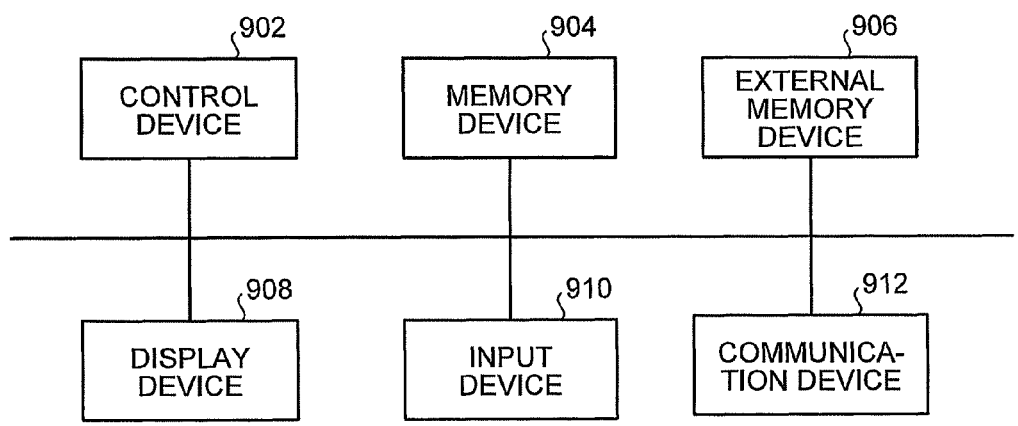
FIG. 13 is a diagram illustrating an exemplary hardware configuration of the feature point detection device according to the embodiments and the modification example.

FIG. 13 is a block diagram illustrating an exemplary hardware configuration of the feature point detection device according to the embodiments and the modification example described above. As illustrated in FIG. 13, the feature point detection device according to the embodiments and the modification example described above has the hardware configuration of a commonly-used computer that includes a control device 902 such as a central processing unit (CPU); a memory device 904 such as a read only memory (ROM) or a random access memory (RAM); an external memory device 906 such as a hard disk drive (HDD) or a solid state drive (SSD); a display device 908 such as a display; an input device 910 such as an imaging device, a recording device, a reading device, a network I/F, a keyboard, or a mouse; and a communication device 912.

The computer program executed in the feature point detection device according to the embodiments and the modification example described above is stored as an installable file or as an executable file in a computer-readable memory medium such as a compact disk read only memory (CD-ROM), a compact disk readable (CD-R), a memory card, a digital versatile disk (DVD), and a flexible disk (FD).

Alternatively, the computer program executed in the feature point detection device according to the embodiments and the modification example described above can be saved as a downloadable file on a computer connected to the Internet or can be made available for distribution through a network such as the Internet. Still alternatively, the computer program executed in the feature point detection device according to the embodiments and the modification example described above can be stored in advance in a ROM or the like.

Meanwhile, the computer program executed in the feature point detection device according to the embodiments and the modification example described above contains a module for each of the abovementioned constituent elements to be implemented in a computer. In practice, for example, a CPU reads a learning program from an HDD and runs it such that the learning program is loaded in a RAM. As a result, the module for each of the abovementioned constituent elements is generated in the computer.

As described above, according to the embodiments and the modification example described above, it becomes possible to reduce the required memory capacity.

For example, unless contrary to the nature thereof, the steps of the flowcharts according to the embodiments described above can have a different execution sequence, can be executed in plurality at the same time, or can be executed in a different sequence every time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A feature point detection device comprising:
a processor to execute a program stored on one or more memories to implement a generator, a K-class classifier, a calculator, an input unit, a classifier, an adder, and a detector, wherein
a training data memory stores therein training data, which represents a set of N (N≥2) number of training samples each of which holding an image pattern of a sample image, D (D≥1) number of true feature points captured in the sample image, and D number of initial feature points corresponding to the D number of true feature points in association with one another;
the generator performs, for T (T≥1) number of times, a generating operation in which
using the training data, the K-class classifier is generated which is expected to classify training samples having a similar image pattern at the initial feature points of the sample image in same class from among K-classes (K≥2) and which outputs a class identifier of the class in which the training samples are classified, and
using the K-class classifier, the N number of training samples are classified in the K-classes and, for each class, a first displacement vector is obtained that approximates the D number of initial feature points of each training sample classified in the class to the D number of true feature points;
a classifier memory stores therein the T number of K-class classifiers;
the calculator calculates, from K×T number of the first displacement vectors and in order to express second displacement vectors to which the K×T number of first displacement vectors are approximated, second displacement label vectors, each being unique to one of K×T number of the second displacement vectors, and a second displacement coordinate vector common to the K×T number of second displacement vectors;
a displacement label memory stores therein, in association with each of K×T number of the second displacement label vectors, a class identifier of a class from which is obtained a first displacement vector approximated to a second displacement vector of the second displacement label vector;

a displacement coordinate memory stores therein the second displacement coordinate vector;

the input unit receives an input image in which D number of initial feature points are set;

the classifier applies the T number of K-class classifiers to the input image and, for each K-class classifier, obtain, from the displacement label memory, a second displacement label vector associated with a class identifier output from the K-class classifier;

the adder performs addition of T number of the second displacement label vectors so as to obtain an added label vector; and the detector detects D number of true feature points of the input image based on the D number of initial feature points set in the input image, based on the added label vector, and based on the second displacement coordinate vector.

2. The device according to claim 1, wherein the detector multiplies the added label vector by the second displacement coordinate vector so as to obtain a third displacement vector consisting of displacement between each of the D number of initial feature points of the input image and its corresponding true feature point from among the D number of true feature points, and adds the third displacement vector to a vector consisting of the D number of initial feature points of the input image so as to detect the D number of true feature points of the input image.

3. The device according to claim 1, wherein the calculator performs principal component analysis on the K×T number of first displacement vectors so as to calculate the second displacement coordinate vector, and projects the K×T number of first displacement vectors in a space formed based on the second displacement coordinate vector so as to obtain the K×T number of second displacement label vectors.

4. The device according to claim 1, wherein the second displacement coordinate vector represents a set of linearly-independent base vectors which establish a subspace including the K×T number of first displacement vectors, the second displacement label vectors consist of linear coefficients with respect to the base vectors, and the detector performs linear combination of the added label vector and the second displacement coordinate vector so as to obtain the third displacement vector.

5. The device according to claim 1, wherein the calculator calculates the second displacement coordinate vector with at least one of linear sum, dispersion, and order statistics of the K×T number of first displacement vectors serving as scale.

6. The device according to claim 1, wherein the processor executes the program to further implement an output unit to output the input image in which the D number of true feature points have been detected.

7. The device according to claim 1, wherein the processor executes the program to further implement:

an analyzer to analyze the input image in which the D number of true feature points have been detected; and an output unit to output an analysis result.

8. A feature point detection device comprising:

a processor to execute a program stored on one or more memories to implement a sorter, a generator, a K-class classifier, an input unit, a classifier, an adder, and a detector, wherein a training data memory stores therein training data, which represents a set of N (N≥2) number of training samples each of which holding an image pattern of a sample image, D (D≥1) number of true feature points captured in the sample image, and D number of initial feature points corresponding to the D number of true feature points in association with one another;

the sorter generates, for each of the N number of training samples, a first displacement vector consisting of displacement of the true feature points corresponding to the D number of initial feature points, sorts the N number of training samples into L (L≥2) number of sets based on N number of the first displacement vectors thus generated, and decides, for each of the L number of sets, a second displacement vector which is a representative first displacement vector of the set;

a first label information memory stores therein, for each first label representing one of the L number of sets, first label information in association with a sample identifier of a training sample which is sorted in a set represented by the first label;

a displacement memory stores therein, for each of the first labels, the second displacement vector of a set represented by the first label;

the generator performs, for T (T≥1) number of times, a generating operation in which using the training data, the K-class classifier is generated which is expected to classify training samples having a similar image pattern at the initial feature points of the sample image in same class from among K-classes (K≥2) and which outputs a class identifier of the class in which the training samples are classified, and using the K-class classifier, the N number of training samples are classified in the K-classes and, for each class, a second label is obtained based on a training sample classified in the class and based on the first label information;

a classifier memory stores therein the T number of K-class classifiers;

a second label information memory stores therein, in association with each of K×T number of the second labels, class identifier of a class from which the second label is obtained;

the input unit receives an input image in which D number of initial feature points are set;

the classifier applies the T number of K-class classifiers to the input image and, for each K-class classifier, obtain, from the second label information memory, a second label associated with a class identifier output from the K-class classifier;

the adder performs addition of second labels having an identical value from among T number of the second labels so as to obtain an additional value for each second label; and the detector detects D number of true feature points of the input image based on the D number of initial feature points set in the input image, based on the additional value for each second label, and based on the L number of the second displacement vectors.

9. The device according to claim 8, wherein the detector multiplies each of the L number of second displacement vectors by the additional value of its corresponding second label, performs addition of the second displacement vectors to each of which the additional value of the corresponding second label has been multiplied, obtains a third displacement vector consisting of displacement between each of the D number of initial feature points of the input image and its corresponding true feature point from among the D number of true feature points, and adds the third displacement vector to the D number of initial feature point vectors of the input image so as to detect the D number of true feature points of the input image.

10. The device according to claim 8, wherein
the sets represent clusters, and
the sorter uses distances of the N number of first displacement vectors and performs clustering of the N number of training samples into L number of the clusters.

11. The device according to claim 10, wherein, for each of the L number of clusters, the sorter decides a second displacement vector using at least one of linear sum, dispersion, and order statistics of distances of first displacement vectors of training samples sorted into the cluster.

12. The device according to claim 8, wherein the second labels are first labels each of which represents a set in which, from among one or more training samples classified in the class, maximum number of training samples are sorted.

13. The device according to claim 8, wherein the second labels represent sorting frequencies with respect to sets of one or more training samples classified in the class.

14. The device according to claim 8, wherein the processor executes the program to further implement an output unit to output the input image in which the D number of true feature points have been detected.

15. The device according to claim 8, wherein the processor executes the program to further implement:
an analyzer to analyze the input image in which the D number of true feature points have been detected; and
an output unit to output an analysis result.

16. A feature point detection method comprising:
performing, for T (T≥1) number of times, a generating operation in which
using training data, which represents a set of N (N≥2) number of training samples each of which holding an image pattern of a sample image, D (D≥1) number of true feature points captured in the sample image, and D number of initial feature points corresponding to the D number of true feature points in association with one another, a K-class classifier is generated which is expected to classify training samples having a similar image pattern at the initial feature points of the sample image in same class from among K-classes (K≥2) and which outputs a class identifier of the class in which the training samples are classified, and
using the K-class classifier, the N number of training samples are classified in the K-classes and, for each class, a first displacement vector is obtained that approximates the D number of initial feature points of each training sample classified in the class to the D number of true feature points;
calculating, from K×T number of the first displacement vectors and in order to express second displacement vectors to which the K×T number of first displacement vectors are approximated, second displacement label vectors, each being unique to one of K×T number of the second displacement vectors, and a second displacement coordinate vector common to the K×T number of second displacement vectors;
receiving an input image in which D number of initial feature points are set;
applying the T number of K-class classifiers to the input image and obtaining, for each K-class classifier, a second displacement label vector associated with a class identifier output from the K-class classifier, from a displacement label memory that stores therein, in association with each of K×T number of the second displacement label vectors, a class identifier of a class from which is obtained a first displacement vector approximated to a second displacement vector of the second displacement label vector;
performing addition of T number of the second displacement label vectors so as to obtain an added label vector; and
detecting D number of true feature points of the input image based on the D number of initial feature points set in the input image, based on the added label vector, and based on the second displacement coordinate vector.

17. A feature point detection method comprising:
generating, for each of N (N≥2) number of training samples constituting training data and holding an image pattern of a sample image, D (D≥1) number of true feature points captured in the sample image, and D number of initial feature points corresponding to the D number of true feature points in association with one another, a first displacement vector consisting of displacement of the true feature points corresponding to the D number of initial feature points,
sorting the N number of training samples into L (L≥2) number of sets based on N number of the first displacement vectors thus generated, and
deciding, for each of the L number of sets, a second displacement vector which is a representative first displacement vector of the set;
perform, for T (T≥1) number of times, a generating operation in which
using the training data, a K-class classifier is generated which is expected to classify training samples having a similar image pattern at the initial feature points of the sample image in same class from among K-classes (K≥2) and which outputs a class identifier of the class in which the training samples are classified, and
using the K-class classifier, the N number of training samples are classified in the K-classes and, for each class, a second label is obtained based on a training sample classified in the class and based on the first label information;
receiving an input image in which D number of initial feature points are set;
applying the T number of K-class classifiers to the input image and obtaining, for each K-class classifier, a second label, which is associated with a class identifier output from the K-class classifier, from a second label information memory that stores therein, in association with each of K×T number of the second labels, class identifier of a class from which the second label is obtained;
performing addition of second labels having an identical value from among T number of the second labels so as to obtain an additional value for each second label; and
detecting D number of true feature points of the input image based on the D number of initial feature points set in the input image, based on the additional value for each second label, and based on the L number of the second displacement vectors.

18. A computer program product comprising a non-transitory computer-readable medium including programmed instructions, wherein the instructions, when executed by a computer, cause the computer to perform:

performing, for T (T≥1) number of times, a generating operation in which using training data, which represents a set of N (N≥2) number of training samples each of which holding an image pattern of a sample image, D (D≥1) number of true feature points captured in the sample image, and D number of initial feature points corresponding to the D number of true feature points in association with one another, a K-class classifier is generated which is expected to classify training samples having a similar image pattern at the initial feature points of the sample image in same class from among K-classes (K≥2) and which outputs a class identifier of the class in which the training samples are classified, and using the K-class classifier, the N number of training samples are classified in the K-classes and, for each class, a first displacement vector is obtained that approximates the D number of initial feature points of each training sample classified in the class to the D number of true feature points;

calculating, from K×T number of the first displacement vectors and in order to express second displacement vectors to which the K×T number of first displacement vectors are approximated, second displacement label vectors, each being unique to one of K×T number of the second displacement vectors, and a second displacement coordinate vector common to the K×T number of second displacement vectors;

receiving an input image in which D number of initial feature points are set;

applying the T number of K-class classifiers to the input image and obtaining, for each K-class classifier, a second displacement label vector associated with a class identifier output from the K-class classifier, from a displacement label memory that stores therein, in association with each of K×T number of the second displacement label vectors, a class identifier of a class from which is obtained a first displacement vector approximated to a second displacement vector of the second displacement label vector;

performing addition of T number of the second displacement label vectors so as to obtain an added label vector; and detecting D number of true feature points of the input image based on the D number of initial feature points set in the input image, based on the added label vector, and based on the second displacement coordinate vector.

19. A computer program product comprising a non-transitory computer-readable medium including programmed instructions, wherein the instructions, when executed by a computer, cause the computer to perform:

generating, for each of N (N≥2) number of training samples constituting training data and holding an image pattern of a sample image, D (D≥1) number of true feature points captured in the sample image, and D number of initial feature points corresponding to the D number of true feature points in association with one another, a first displacement vector consisting of displacement of the true feature points corresponding to the D number of initial feature points, sorting the N number of training samples into L (L≥2) number of sets based on N number of the first displacement vectors thus generated, and deciding, for each of the L number of sets, a second displacement vector which is a representative first displacement vector of the set;

perform, for T (T≥1) number of times, a generating operation in which using the training data, a K-class classifier is generated which is expected to classify training samples having a similar image pattern at the initial feature points of the sample image in same class from among K-classes (K≥2) and which outputs a class identifier of the class in which the training samples are classified, and using the K-class classifier, the N number of training samples are classified in the K-classes and, for each class, a second label is obtained based on a training sample classified in the class and based on the first label information;

receiving an input image in which D number of initial feature points are set;

applying the T number of K-class classifiers to the input image and obtaining, for each K-class classifier, a second label, which is associated with a class identifier output from the K-class classifier, from a second label information memory that stores therein, in association with each of K×T number of the second labels, class identifier of a class from which the second label is obtained;

performing addition of second labels having an identical value from among T number of the second labels so as to obtain an additional value for each second label; and detecting D number of true feature points of the input image based on the D number of initial feature points set in the input image, based on the additional value for each second label, and based on the L number of the second displacement vectors.

* * * * *